(12) United States Patent
Stephanos

(10) Patent No.: US 7,490,577 B2
(45) Date of Patent: Feb. 17, 2009

(54) PORTABLE WATER DRINKING TROUGH FOR PETS

(76) Inventor: Prodromos Pericles Stephanos, 1255 Juanita Dr., Walnut Creek, CA (US) 94595

(*) Notice: Subject to any disclaimer, the term of this patent is extended or adjusted under 35 U.S.C. 154(b) by 319 days.

(21) Appl. No.: 10/578,209

(22) PCT Filed: Nov. 4, 2004

(86) PCT No.: PCT/US2004/036861

§ 371 (c)(1),
(2), (4) Date: May 4, 2006

(87) PCT Pub. No.: WO2005/046317

PCT Pub. Date: May 26, 2005

(65) Prior Publication Data

US 2007/0079762 A1    Apr. 12, 2007

(51) Int. Cl.
*A01K 7/00*    (2006.01)

(52) U.S. Cl. .................................. 119/74; 119/52.1

(58) Field of Classification Search .................. 119/72, 119/74, 52.1; 211/74; 215/390; 141/351; 222/490, 494; D30/121, 129, 132
See application file for complete search history.

(56) References Cited

U.S. PATENT DOCUMENTS

| 552,780 | A | * | 1/1896 | Rood | 215/390 |
| 1,784,880 | A | * | 12/1930 | Ferdinand | 215/390 |
| D316,382 | S | * | 4/1991 | Lorenzana et al. | D11/164 |
| 5,636,592 | A | * | 6/1997 | Wechsler | 119/52.1 |
| 5,960,742 | A | * | 10/1999 | O'Rourke et al. | 119/74 |
| D423,736 | S | * | 4/2000 | O'Rourke et al. | D30/132 |
| D468,489 | S | * | 1/2003 | Wechsler | D30/132 |
| 6,640,748 | B1 | * | 11/2003 | Cheng | 119/72 |
| 6,718,911 | B2 | * | 4/2004 | Greenberg | 119/51.5 |
| 7,287,487 | B2 | * | 10/2007 | Hurwitz | 119/74 |
| 2002/0088405 | A1 | * | 7/2002 | Ho | 119/72 |

* cited by examiner

*Primary Examiner*—Kimberly S Smith
(74) *Attorney, Agent, or Firm*—Holland & Knight LLP; Richard E. Lyon, Jr.

(57) ABSTRACT

A portable water drinking device for pets adapted to be used with a conventional sports water bottle wherein the device includes a lapping pan and a clip assembly for carrying the water bottle in both an elevated serving position with respect to the pan and in a nested storage position. The clip assembly includes an extension arm portion operatively connected to and projecting from the pan and a gripping arm portion integrally formed with and projecting perpendicularly from the extension arm portion and defining a bifurcated end portion configured and sized to grip the neck of the bottle. The orientation of the clip assembly with respect to the pan is moveable so as to secure the water bottle in either the elevated inclined serving position or in the nesting storage position.

18 Claims, 12 Drawing Sheets

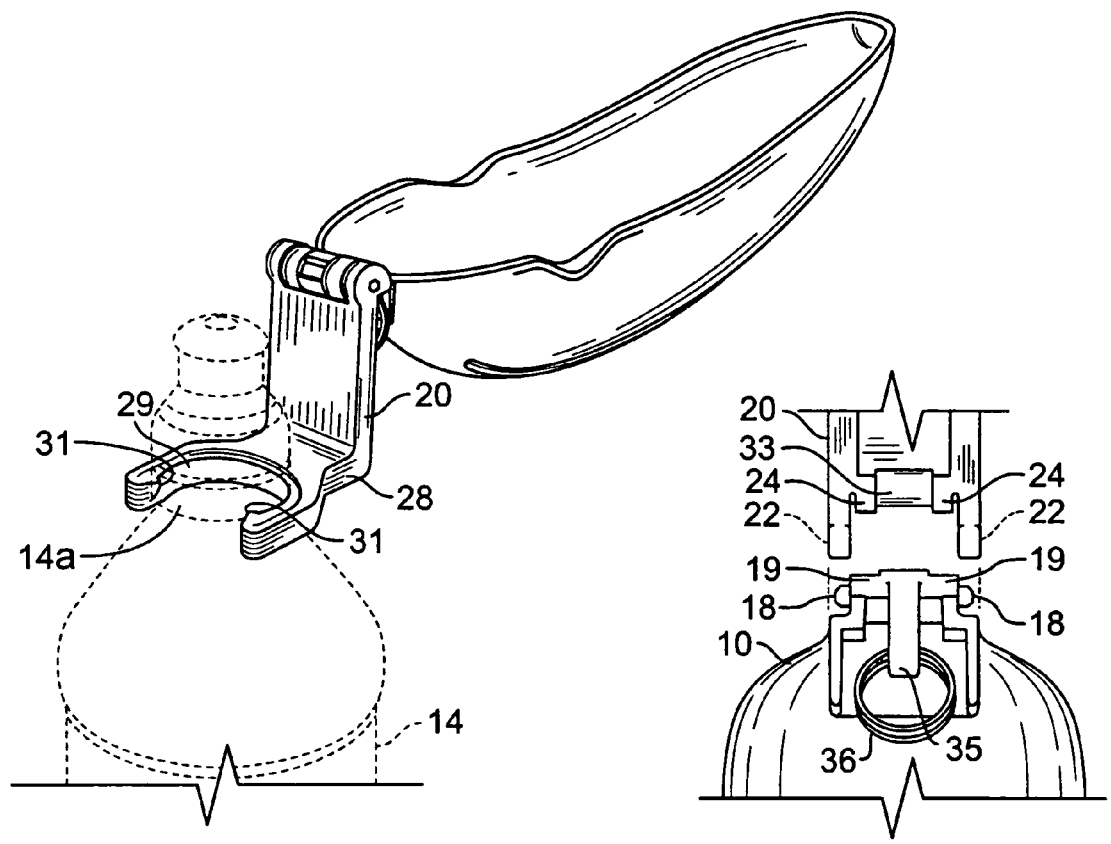
FIG. 3
FIG. 4B
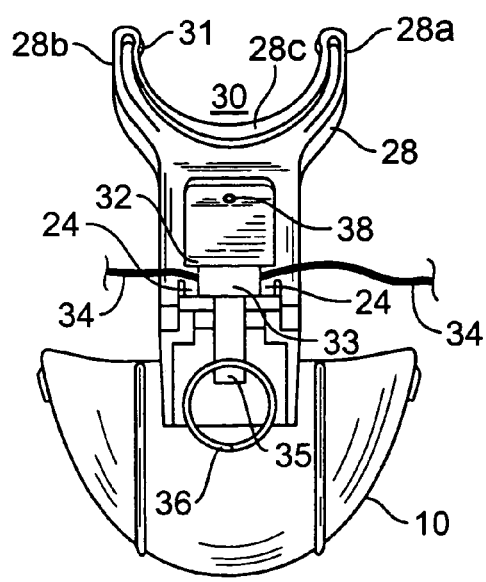
FIG. 4A
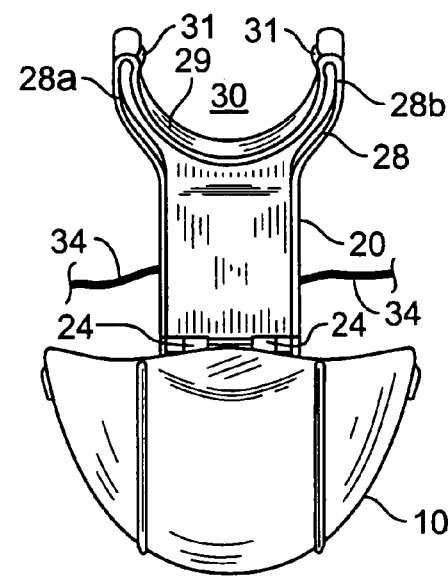
FIG. 5

42mm Deep
65 Wide

Section A-A

43mm Deep
70 Wide

Section B-B

42mm Deep
68 Wide

Section C-C

30mm Deep
55 Wide

Section D-D

PORTABLE WATER DRINKING TROUGH FOR PETS

BACKGROUND OF THE INVENTION

Field of the Invention

The present invention relates to portable drinking devices for pets and particularly for dogs. The provision of food and water care for dogs and other animal pets is today often approached with virtually the same diligence as applied to human family members. Because of the strong emotional bond between dogs and their owners, dogs are frequently taken on both recreational and exercise excursions. While on these excursions, food and water for dogs is very important. There are many dry dog food and treats which are readily portable and easily dispensable without undue mess and cleanup. Water, however, is frequently a problem. A bottle of water and some form of bowl or cup provides the dog with a portable water supply and drinking apparatus but is often an inconvenient method of providing the dog with a drink of water, particularly if on foot. Drinking water is now provide by numerous sources in what are termed "sports bottles," which are manufactured in a variety of sizes (e.g., 8-oz., 16-oz., 32-oz., etc.) yet have the same neck diameter (28 mm), approximately the same axial spacing between the collar and the water bottle shoulder (7 mm) and a screw-on cap generally provided with a push-pull flow nozzle. While recently somewhat larger diameter necks have been employed on sports water bottles (33 mm), 28 millimeters remains the standard for the great majority of such bottles. It would be highly desirable to provide a mechanism by which the standardization of the configuration of readily available sports bottles which has evolved over the years could be effectively utilized in the provision of a portable drinking trough for pets. Applicant has developed a novel clip and trough assembly which obtains that result.

SUMMARY OF THE INVENTION

The portable water drinking trough for pets of the present invention is adapted for use with conventional sports bottles of the type provided with a removable push-pull nozzle, an upper shoulder and a standardized neck collar therebetween. The device includes a lapping pan and a clip member attached to one end of the pan for releasably gripping the neck collar of the sports bottle such that the sports bottle can be oriented with respect to the pan in both a nesting or storage position and in a serving position. In the nested position, the pan is disposed about and adjacent a portion of the sports bottle in a compact disposition. In the serving position, the container is in an inclined inverted position above the pan such that the discharge of water through the bottle nozzle flows into the lapping pan. In one embodiment of the invention, the clip allows pivotal movement between the storage and serving positions. In a second embodiment, the clip is removable from the pan and selectively attachable thereto in either the storage or serving position. Additionally, the clip member can be provided with a belt clip integrally formed thereon for conveniently affixing the trough and attached sports bottle to one's wearing apparel.

DESCRIPTION OF THE PREFERRED EMBODIMENTS

In the Drawings

FIG. 3 is a perspective view of a modification of the embodiment of the present invention shown in FIG. 1 wherein the sports bottle, a portion of which is shown in phantom lines, is moveable rearwardly of the serving position.

FIG. 4A is a rear plan view of the embodiment of the present invention shown in FIG. 1.

FIG. 4B is an exploded partial rear view of the embodiment of the present invention shown in FIG. 1.

FIG. 5 is a front plan view of the embodiment of the present invention shown in FIG. 1.

DETAILED DESCRIPTION OF THE PREFERRED EMBODIMENTS

Figure 1:
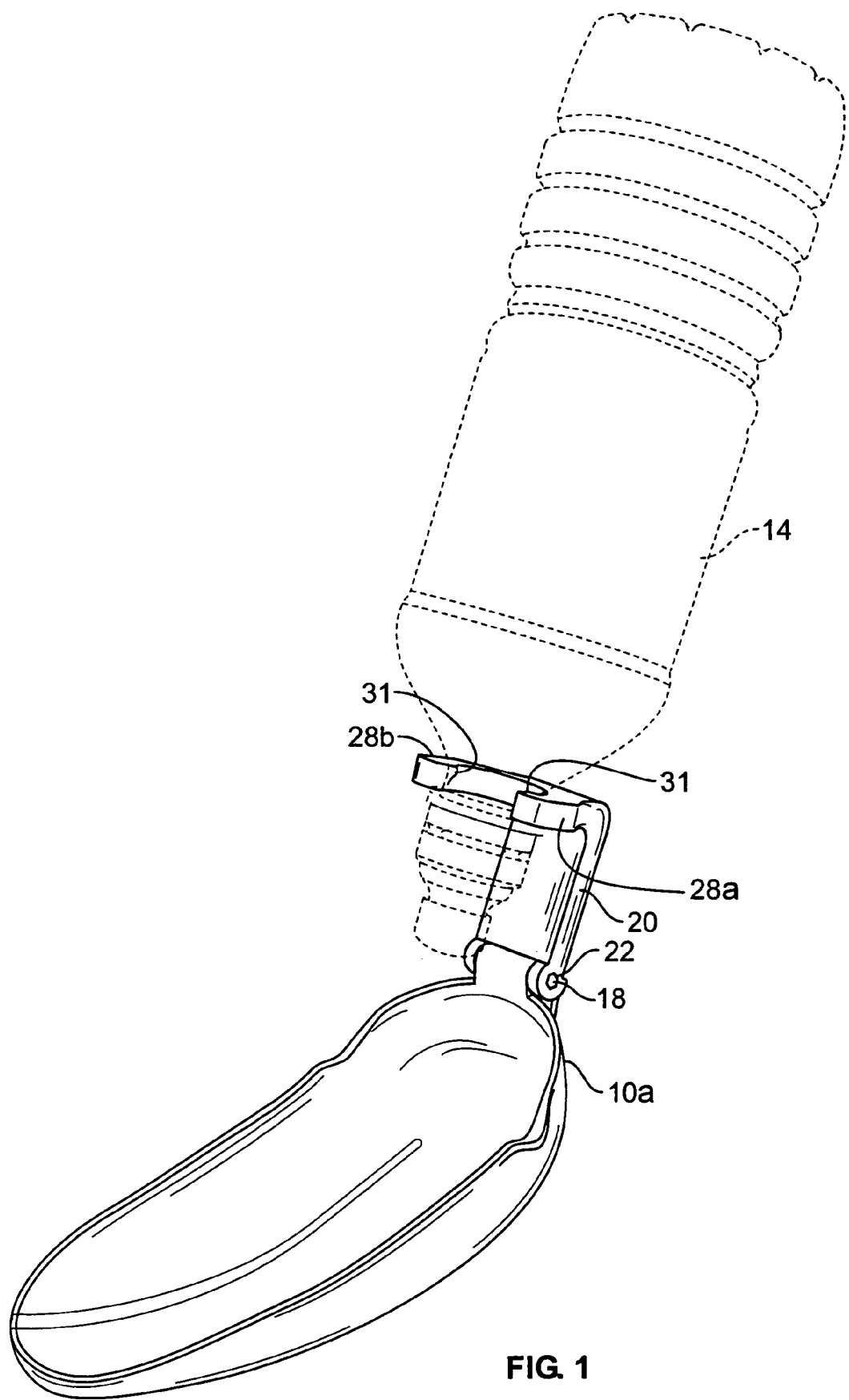
FIG. 1 is a perspective view of a first embodiment of the portable water drinking trough for pets of the present invention showing the device in the serving position with the sports bottle illustrated in phantom lines.
Figure 2:
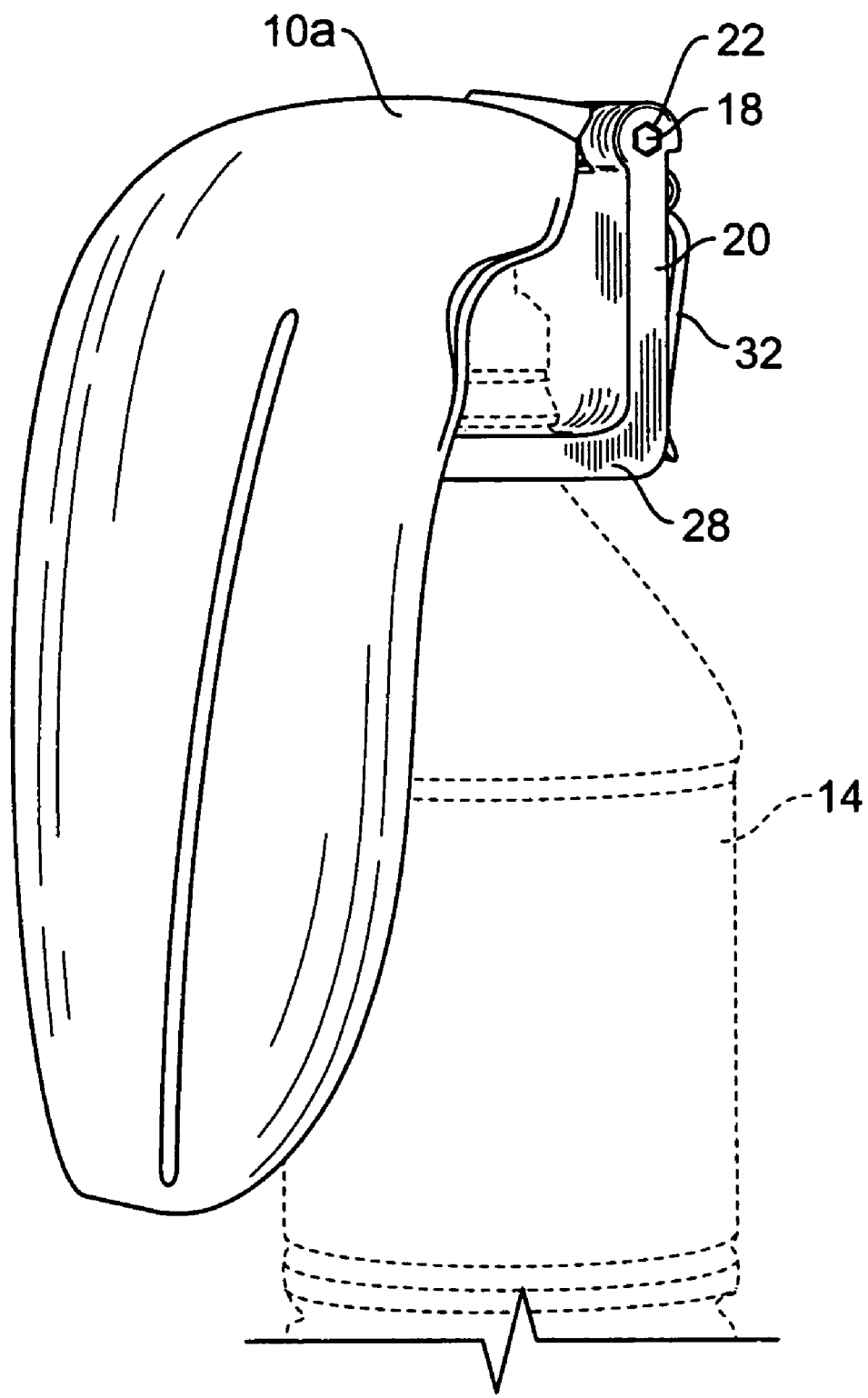
FIG. 2 is a perspective view of the embodiment of the present invention shown in FIG. 1 illustrating the device in the nested position with the sports bottle illustrated in phantom lines.
Figure 6:
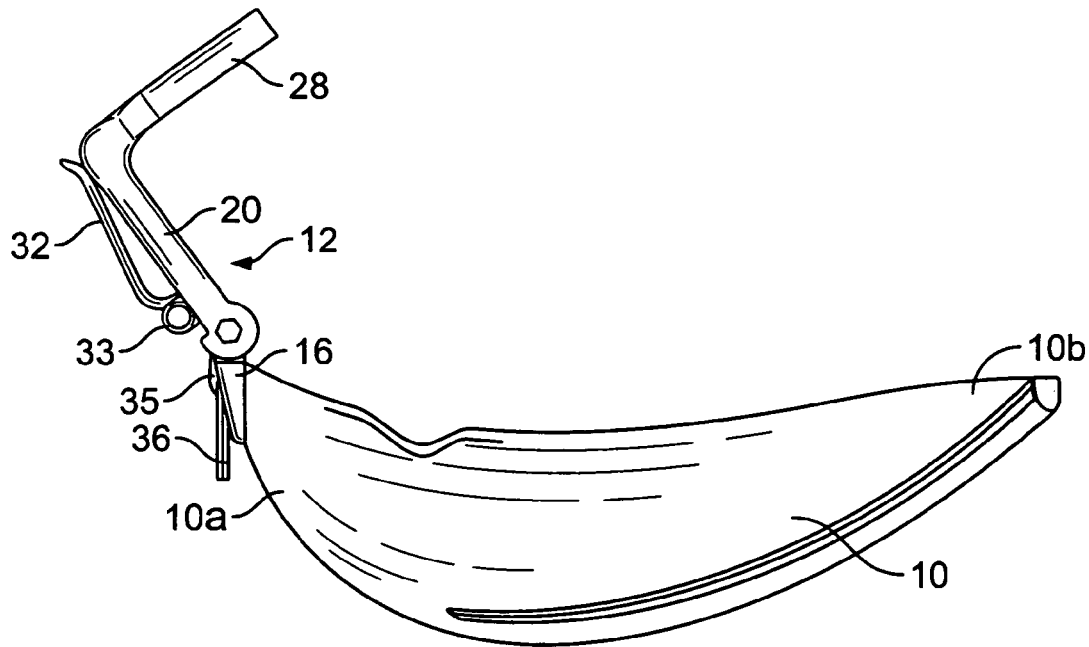
FIG. 6 is a side view of the embodiment of the present invention shown in FIG. 1.
Figure 7:
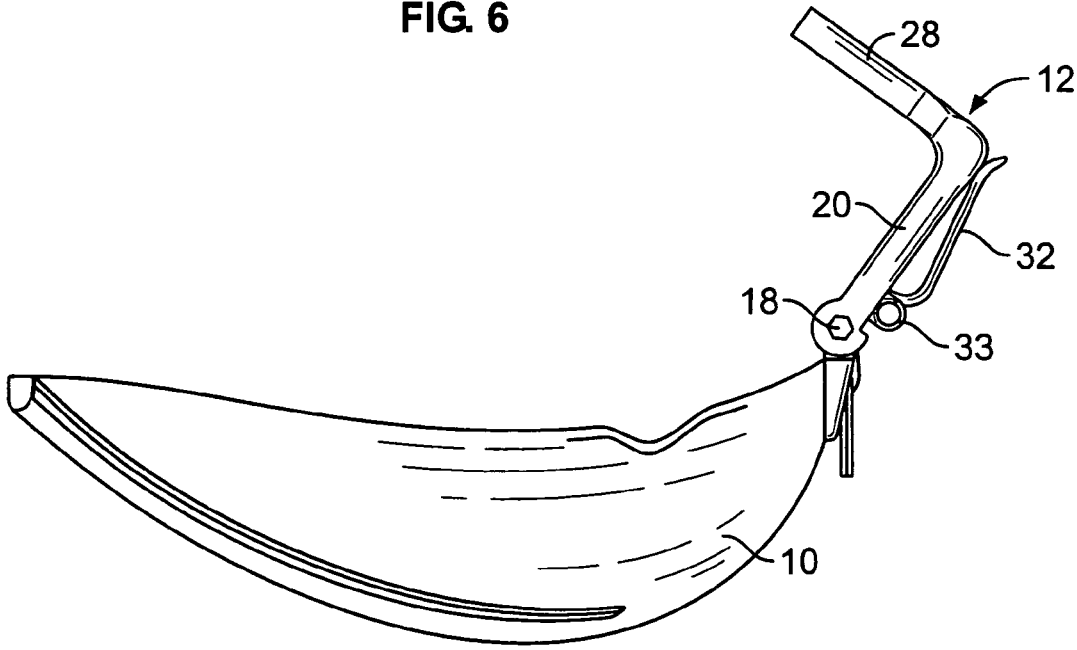
FIG. 7 is a side view of the embodiment of the present invention shown in FIG. 1 as seen from the opposite side of FIG. 6.
Figure 8:
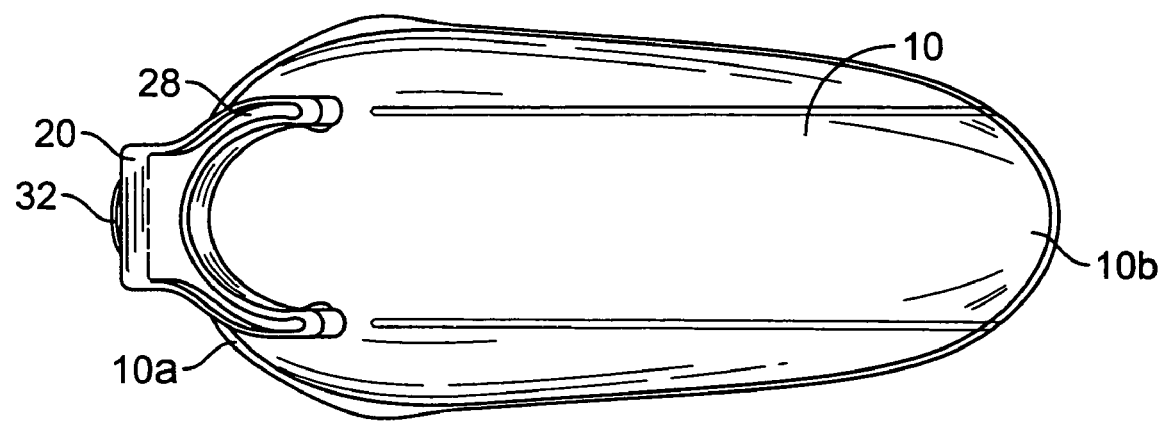
FIG. 8 is a top plan view of the embodiment of the present invention shown in FIG. 1.
Figure 9:
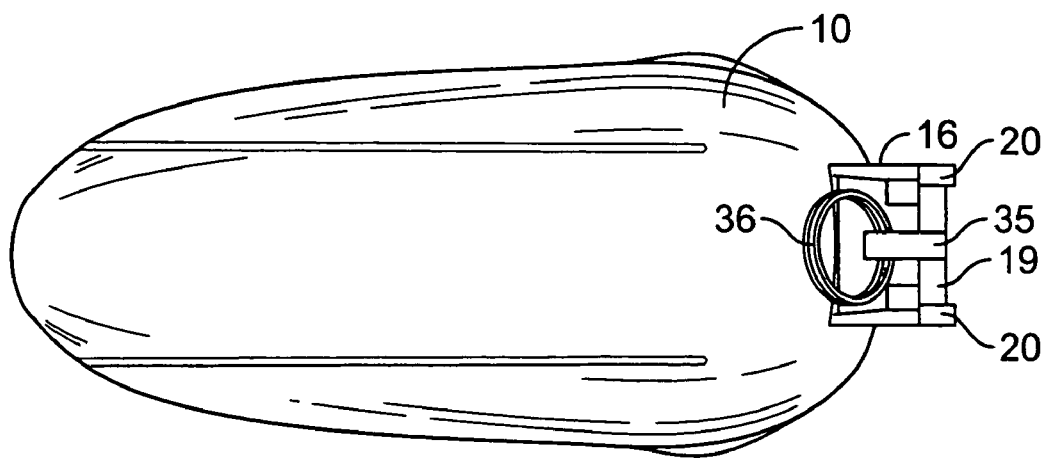
FIG. 9 is a bottom plan view of the embodiment of the present invention shown in FIG. 1.

FIGS. 1-5 illustrate the configuration and use of a first embodiment of the present invention comprising a trough or lapping pan 10 and clip assembly 12 that is hingedly connected to pan 10 at the rearward end 10a thereof. The clip assembly 12 is adapted to releasably engage the neck 14a of a conventional sports water bottle 14 and pivot the bottle with respect to the pan between a serving position (FIG. 1) and a folded nesting position (FIG. 2). The clip assembly 12 is preferably formed of a durable and resilient plastic or resin material such as that marketed under the trademark DELRIN® by DuPont. The trough 10 is preferably formed of plastic, is about 150 to 170 mm in length and about 77 mm wide and has a graduating depth of about 40 to 50 mm. The trough preferably defines a oval perimeter and curved or tapered bottom so as to at least partially fit about or nest with various diameter sports bottles and permit adequate and comfortable access of the pet's muzzle for lapping and drinking water. The inside of the bottom of the water trough may be provided with forwardly radiating, arcuately rounded ridges (ripple appearance) about 2 mm high by 2 mm wide (not shown) which act as flow inhibitors to retard slightly the flow of water toward the forward end 10b of the trough. Such ripples could also provide a trade dress/design feature. The forward end of the trough 10 is preferably provided with a vertical wall 13 of about 15 mm in height to stop or reduce water spills from that end of the trough.

The clip assembly 12 of the present invention is secured to the rearward end 10a of the trough which, in the embodiment of the invention shown in FIGS. 1-5, is provided with an upstanding base portion 16 which preferably is molded into the rearward end of the trough and defines a pair of outwardly projecting opposed pivot pins 18 and a laterally extending stop member 19. The clip assembly 12 includes an extension arm portion 20 and a bottle attachment arm portion 28. The extension arm portion 20 of the clip assembly is pivotally connected to the base portion 16 by means of a pair of laterally spaced apertures 22 which are formed in a lower bifurcated end portion of arm portion 20 and receive the pivot pins 18 on the base of the trough. A pair of depending laterally spaced projections 24 are provided adjacent apertures 22 which abut the stop member 19 so as to limit the outward pivotal movement of the clip assembly with respect to the trough when moved from the storage or nesting position to the serving position. Thus, the cooperation of the stop member 19 and projections 24 will maintain the trough at the desired angular orientation with respect to the water bottle while a pet laps water from the trough in the service position. Extension arm 20 is preferably about 60 mm in length by about 25 mm wide but can be otherwise dimensioned as required for its intended purpose.

While pivot pins 18 are shown in FIGS. 1-7 for the pivotal securement of the extension arm portion of the clip to the base thereof, other attachment mechanisms could be employed. For example, the desired pivotal mounting could be provided by a rotary ratchet pivot 118, such as that illustrated in FIG. 10A, or by a molded living hinge. Similarly other configurations could be employed for limiting the extent of the rotation of the trough 12 relative to the container 14. The stop number 19 and cooperating projections 24 could also be configured such that the extension arm position 20 of the clip assembly could be forced rearwardly by the pet owner over the stop member to a disposition that would allow the pet owner to drink freely from the bottle unencumbered by the trough and without having to detach the water bottle from the clip assembly. Such an orientation is illustrated in FIG. 3. Such a modification could be accomplished by reducing the size of the stop member and the thickness of the projections such that they could flex and be forced over the stop to the desired position. Additional minor modifications to the base portion 16 of the trough and the bottom of the clip assembly may also be molded. For example, the key chain loop 35 (to be discussed) may need to be removed.

Clip assembly 12 also defines an attachment arm 28 at the extended end of extension arm portion 20. The attachment arm 28 is preferably integrally formed with extension arm 20 and is perpendicularly disposed with respect thereto. Note, however, that the attachment arm 28 can be separately formed from the extension arm portion 20 of the clip assembly and secured to arm portion 20 by threaded or other fasteners (not shown) if desired. The attachment arm 28 is bifurcated at its extended end to define two extended arm portions 28a and 28b that are 7 mm thick and project approximately 35 mm so as to define a generally semicircular gripping surface 29 that is defined by the arm portions 28a and 28b and a spanning portion 28c. Gripping surface 29 thus has an axial length (transverse dimension) of 7 mm and circumscribes a substantially semicircular enclosure or area 30 having a diameter of 28 mm. As a result of such a configuration and sizing, the attachment arm 28 can easily and securely clip onto and snugly grip the standard neck 14a between the collar 14b and shoulder 14c of a conventional sports water bottle 14, preventing any upward and downward wobble of the clip assembly 12 when mounted on the bottle neck by filling the standardly dimensioned space (7 mm) between the collar 14b of the standard issue sports water bottle and the shoulder 14c of the bottle. The clip assembly 12 should preferably have approximately a ±5-7% expansion/stretch capability with respect to the inner diameter or transverse dimension (28 mm) defined by the attachment arm portions 28a and 28b to accommodate off-sized bottlenecks. This flexibility can be provided by a thin slit in the attachment arm 28 between the two arm portions thereof. It should be noted that water bottles having conventional cap tops as opposed to sport top nozzles have this same neck size and configuration and could be used with the present invention.

To more easily transition the neck of the bottle into area 30 between arm portions 28a and 28b, inclined protruding ridges 31 are preferably formed in surface 29 adjacent the extended ends of arms 28a and 28b. Ridges 31 also assist in the gripping of the bottle.

Recently, water bottles having a slightly larger neck size (33 mm) have been utilized, although in far fewer numbers than the standard 28 mm size. For such sizes, the clip assemblies could be provided having attachment arms that circumscribe a correspondingly enlarged semicircular area 30.

In use, the attachment arm 28 of the clip assembly 12 is pushed onto the neck portion 14a of the water bottle 14 between the collar 14b and shoulder 14c whereupon the natural resilience in arm portions 28a and 28b will secure the clip to the bottle 14, which in turn secures the bottle 14 to the trough 10. So secured, the bottle can be moved between a compact storage position, illustrated in FIGS. 2 and 4, wherein at least a portion of the bottle is disposed within the interior of the trough 10 and a serving position, illustrated in FIGS. 1 and 3, wherein the bottle 14 is in an inclined elevated position with respect to the trough allowing for a desired amount of water to be dispensed into the trough for consumption by a pet. By allowing further relative movement between the water bottle and trough such that the bottle is forcibly pivoted beyond the serving position as above-described (see FIG. 3), the trough can be moved sufficiently out of the way so that the pet owner could drink from the bottle without even having to detach the bottle from the trough. As there is no backwash with sports bottles, and the push-pull nozzle typically employed on such bottles is sufficiently spaced from the water trough by virtue of the attachment afforded by clip assembly 12, there is no contact between the dog's muzzle and the water bottle nozzle.

In the preferred embodiments of the present invention, the back side of the extension arm portion 20 of the clip assembly defines a resilient belt clip 32 which acts as a spring and is integrally formed (preferably molded) with the clip assembly to provide a conventional and inexpensive means for securing the present invention to the belt or waistband of the user's apparel. A transversely disposed open-ended loop 33 also is preferably integrally formed as a part of the clip assembly for the securement of a lanyard 34 for use as a shoulder strap for carrying the device of the present invention. A second loop 35 can also be provided, preferably on the base portion 16 of the trough below stop member 19, for carrying a key chain ring 36 or an ornamental device. An aperture 38 can be provided in the end portion of the belt clip 32 for securing a label by means of a tie or plastic wire (not shown).

Figure 10A:
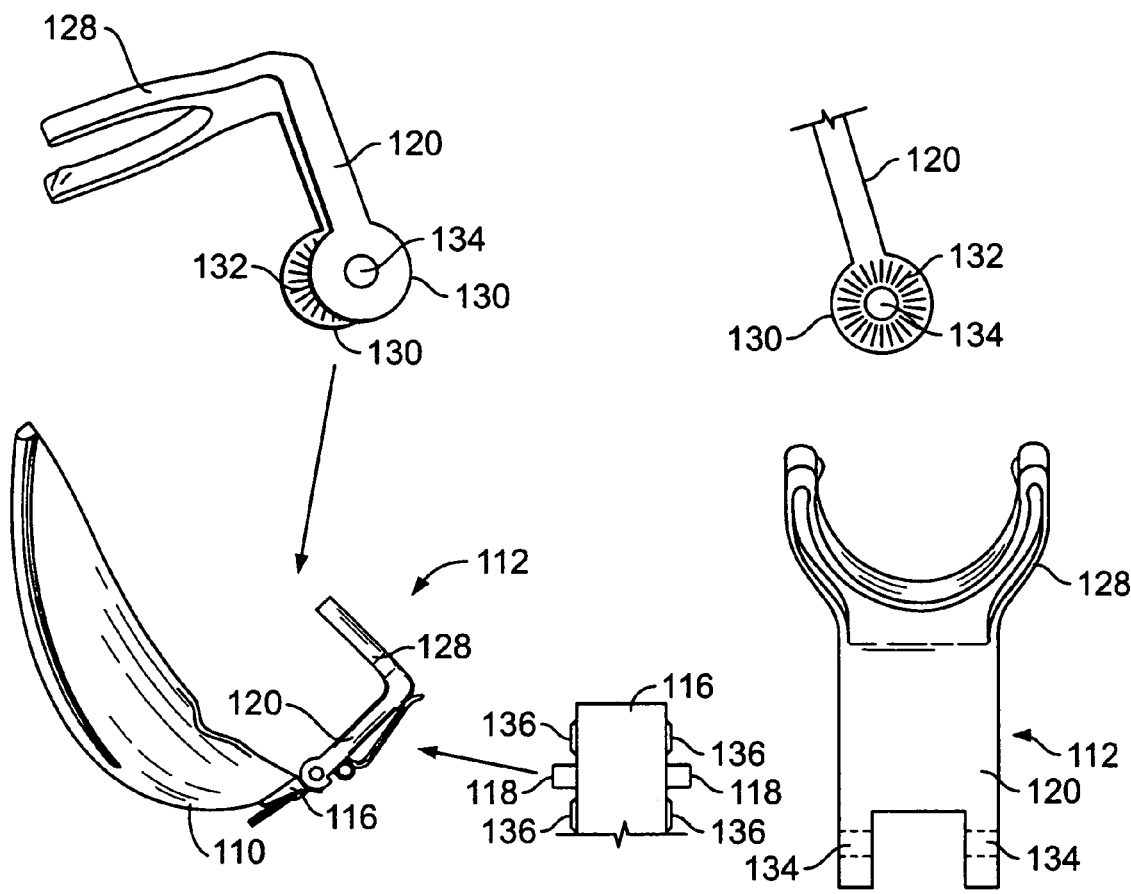
FIG. 10A is a series of exploded perspective views of a modified form of the embodiment of the invention illustrated in FIGS. 1-9.

A modified form of the above-described clip assembly is illustrated in FIG. 10A. As seen therein, the clip assembly 112 employs a ratchet-type attachment between the extension arm portion 120 of the clip assembly and an upwardly projecting base member 116 formed at the rearward end of the trough 110. In this embodiment, the clip assembly 112 includes an attachment arm 128 identical to the attachment arm 28 of the prior embodiment, an extending arm portion 112 preferably integrally joined at one of its ends with attachment arm 128 and defining at its other end a pair of spaced-apart, generally circular, ratchet members 130. The ratchet members each define a circular array of inwardly ratchet teeth 132 thereon disposed about a central aperture 134. The base member 116 in trough 110 defines opposed outwardly projecting circular arrays of ratchet teeth 136 adapted to mate with the inwardly projecting teeth 132 on the clip 112. A pivot pin 118 extends transversely through base member 116 and projects outwardly from the opposed sides thereof along the central axis defined by the aligned pairs of ratchet teeth 132. Alternatively, a pair of outwardly projecting opposed hinge pins could be employed. The extended ends of pivot pin 118 project through the central apertures 134 in the ratchet members 130 on the clip assembly. The natural resiliency in the plastic material of clip assembly 112 is formed will maintain the ratchet teeth in an engaged position so as to prevent inadvertent relative rotation of the clip assembly with respect to the trough 110 while allowing for a deliberate rotation thereof. Thus, through such a ratchet assembly, the desired angular orientation of the trough relative to the water bottle can be easily obtained and maintained by the user of the device.

In another modification of the present invention (not shown) the clip assembly can be pivotally connected to the rear or base of the lapping pan or trough by means of a living hinge. Again, stops would be preferably provided so as to limit the pivotal movement afforded by the living hinge such that trough can be moved between the semi-nested and serving positions and, if desired, beyond the serving position to enable the pet owner to drink from the water bottle without having to detach the bottle from the clip assembly.

Figure 10B:
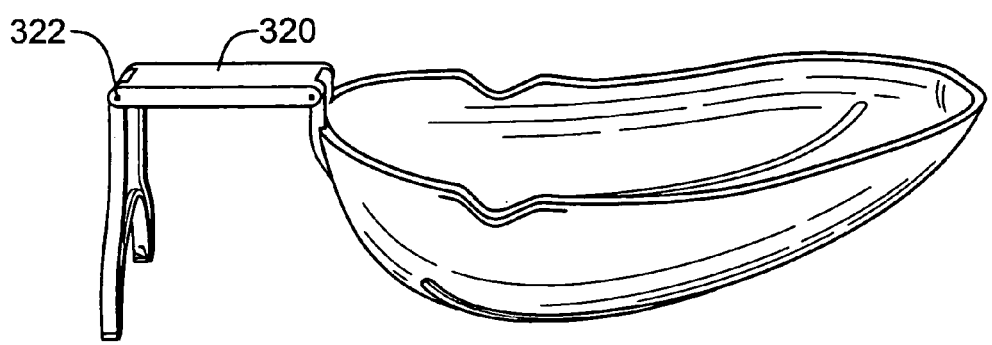
FIG. 10B is a perspective view of another modified form of the present invention.

In yet another modification of the clip assembly (see FIG. 10B) the extension arm portion 320 of the clip assembly 312 is provided with a second hinge or pivot 322. The addition of a second pivot point in the extension arm portion of the clip assembly allows the clip assembly to be disposed almost entirely within the trough to facilitate storage and shipping of the product and allows the clip and trough to form a tripod configuration, as illustrated in FIG. 10B. The tripod configuration enables the trough to rest upright on the ground so that the pet can drink from the trough without the assistance of the owner. Such a clip configuration also moves the nozzle of the water sports bottle further from the pet's nose in the conventional serving position. Alternatively, the outer surface of the trough could be provided with supporting feet or flattened (not shown) so that the water bottle could be detached and the trough would be self-supporting, enabling the pet to drink from the trough without human assistance.

Figure 11A:
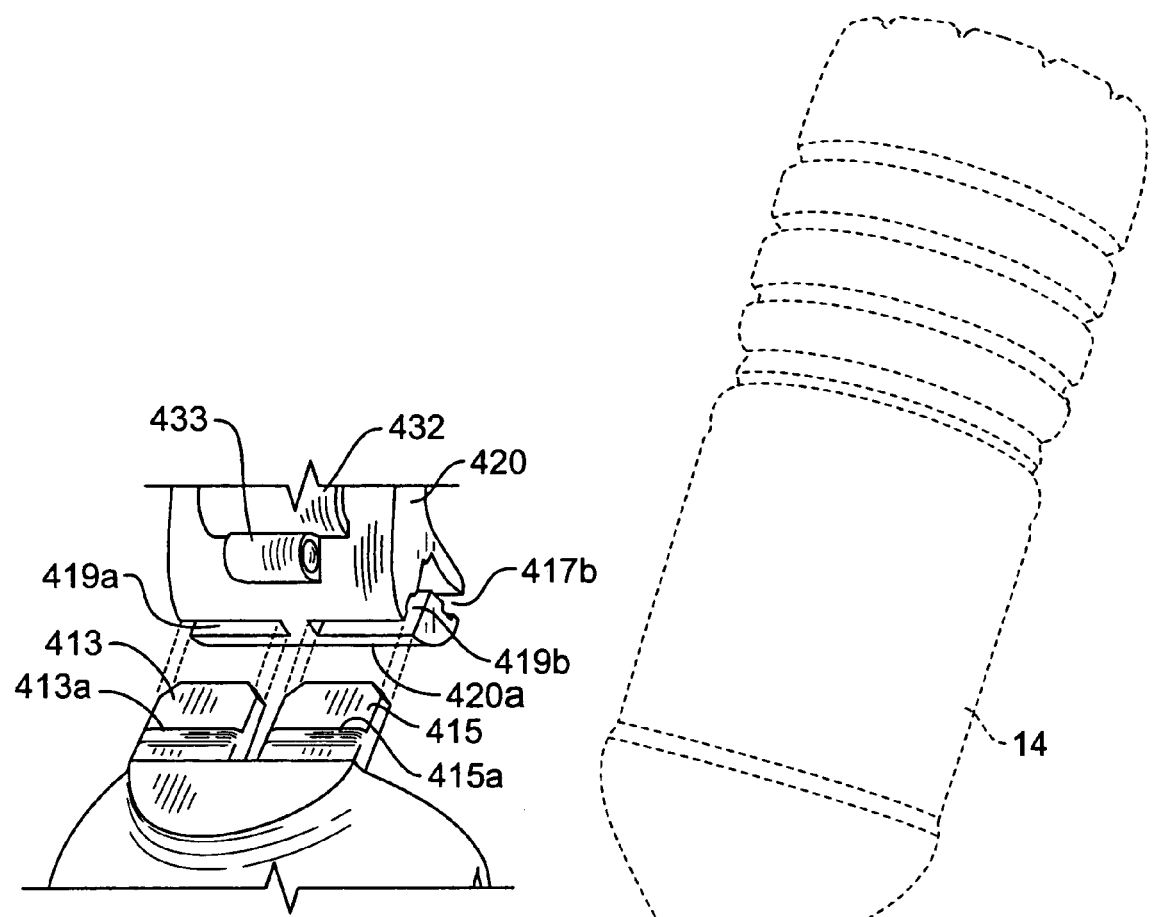
FIG. 11A is a partial exploded view showing the attachment of the clip to the lapping pan in the embodiment of the present invention illustrated in FIG. 11.
Figure 11:
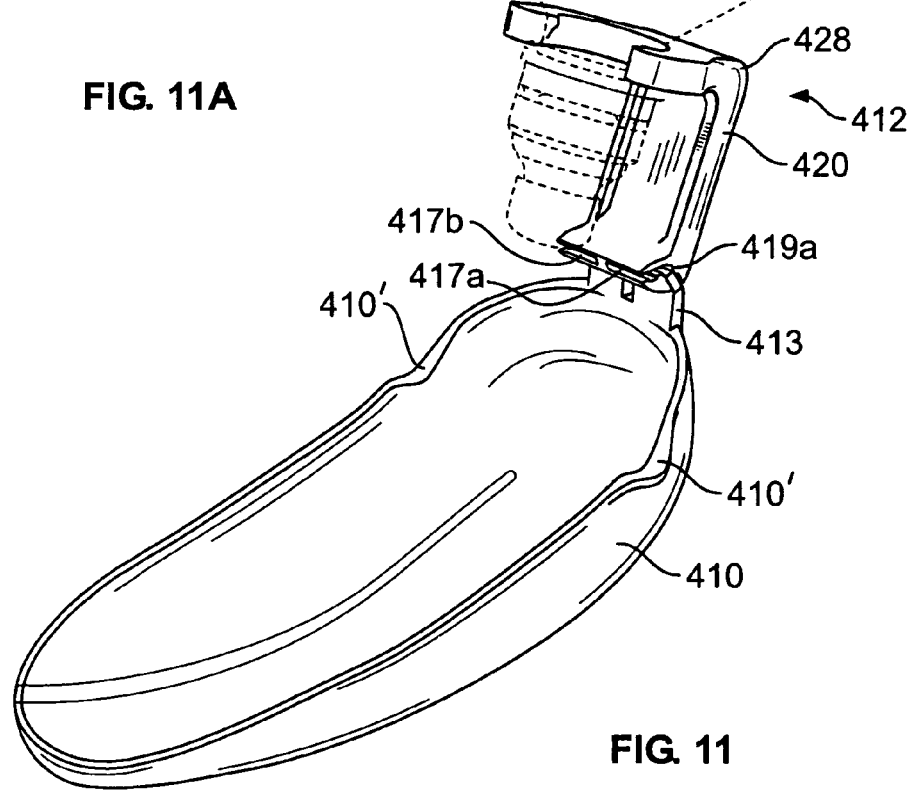
FIG. 11 is a perspective view of a second embodiment of the present invention showing the clip attached to the lapping pan in the serving position and the sports bottle in phantom lines.
Figure 12:
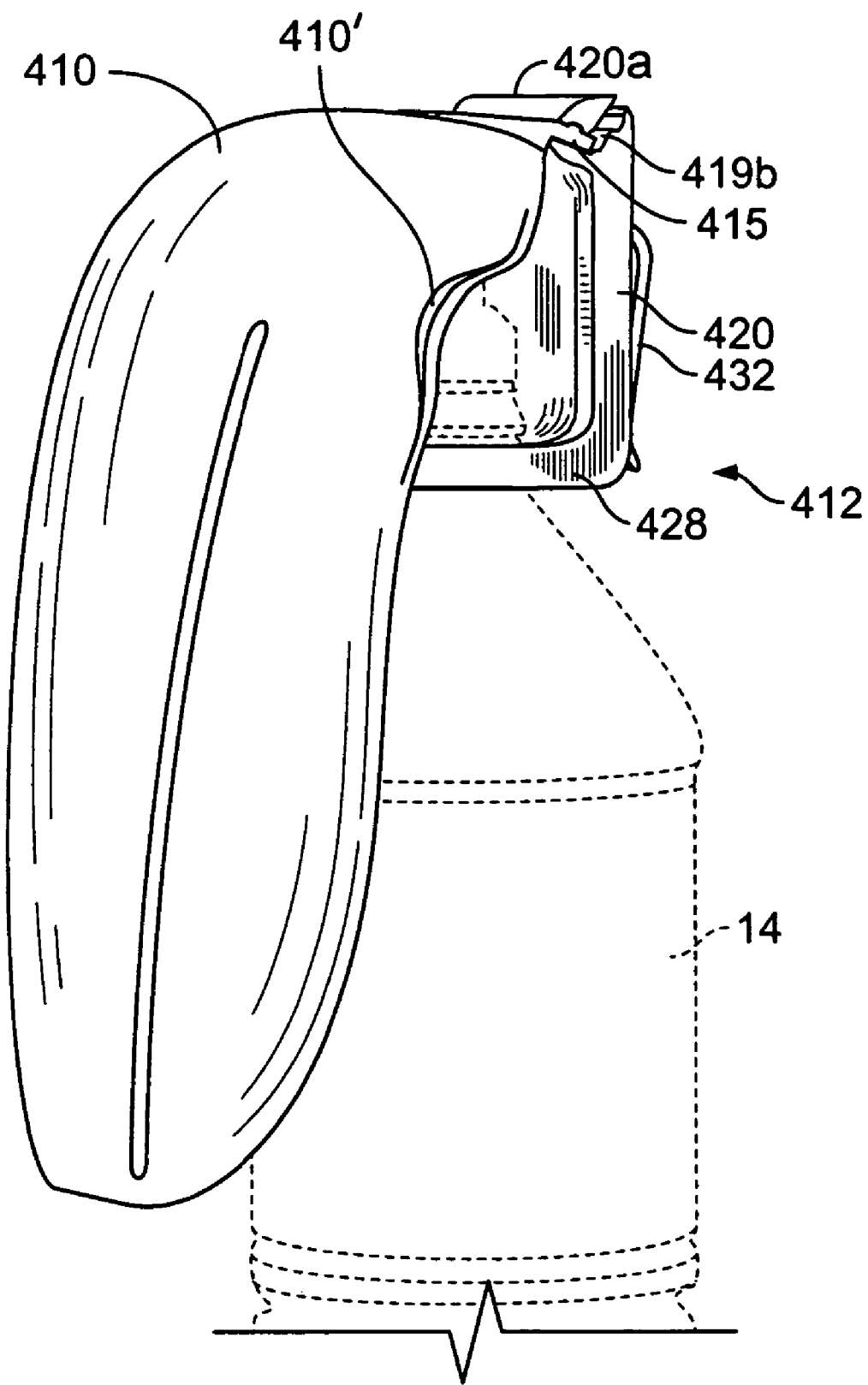
FIG. 12 is a perspective view of the second embodiment of the present invention showing the clip attached to the lapping pan in the folded nested position and a portion of the lapping pan in phantom lines.
Figure 13:
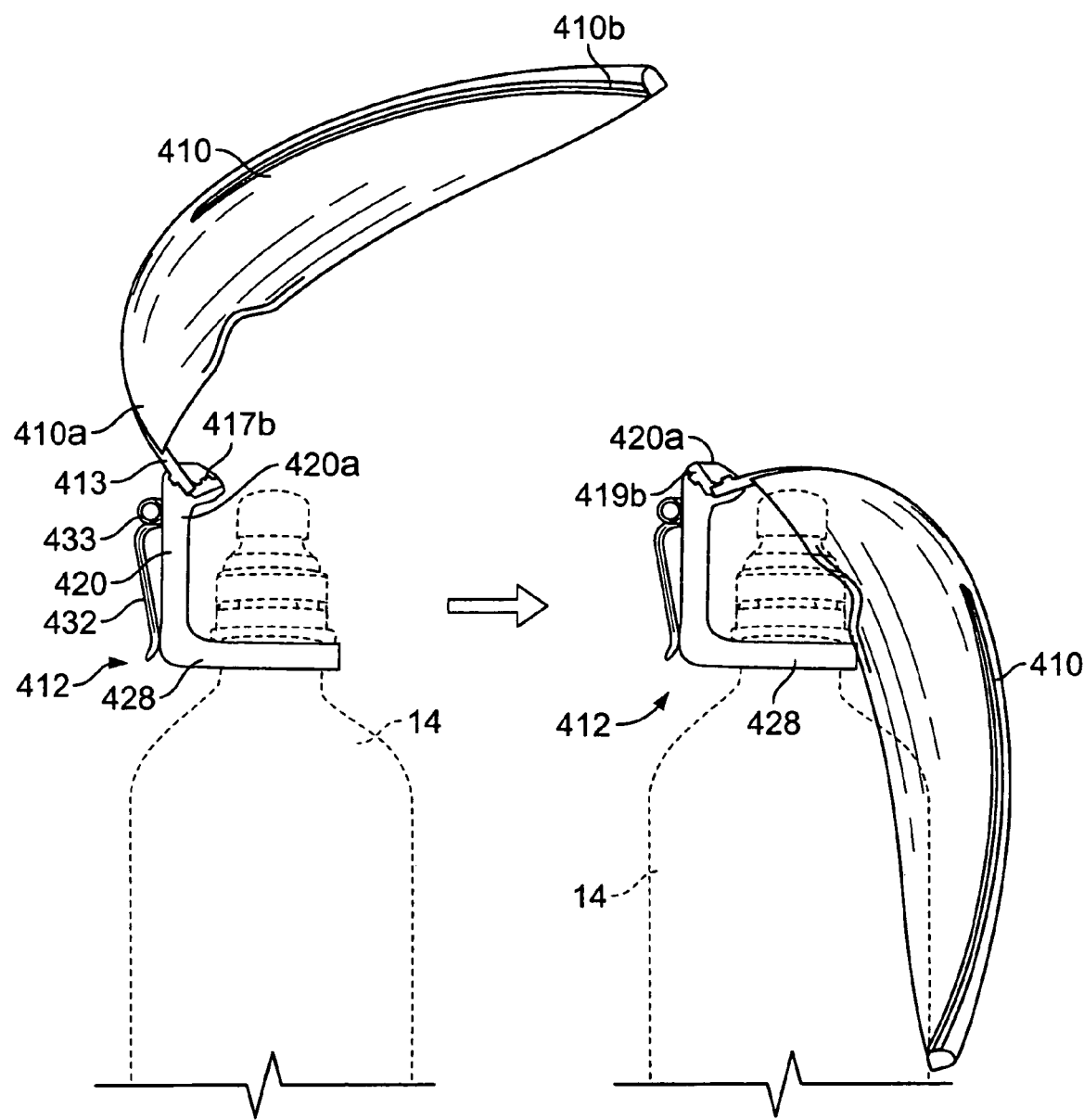
FIG. 13 is a pair of perspective views of the second embodiment of the present invention illustrating the device in the serving and nested positions.

FIGS. 11-13 illustrate an alternate embodiment of the present invention comprising a lapping pan or wherein the clip assembly is detached from the pan to move the clip assembly between the serving and storage positions. In this embodiment, rearward end 410a of the trough 410 defines a laterally spaced pair of upstanding clip attachment flanges or locking tabs 413 and 415 that are preferably slightly inclined in a forward direction, inwardly tapered at their extended ends and each define forwardly and rearwardly facing surfaces with the rearwardly facing surface on each tab preferably defining a transversely extending locking bar 413a and 415a respectively. The upper and lower surfaces of each bar are preferably rounded and the ends of the bars are preferably inwardly tapered at 45° as seen in FIG. 11A.

The extended end 420a of the extension arm portion 420 of the clip assembly 412 employed with trough 410 defines two pair of laterally spaced angularly offset receiving areas 417a and 417b and 419a and 419b that are configured to receive and hold therein the locking tabs 413 and 415. Receiving areas 417a and 417b are positioned relative to the longitudinal axis of the extension arm portion 420 of the clip assembly such that when the tabs 413 and 415 on the trough are snapped into receiving areas 417a and 417b respectively, the clip assembly 412 is oriented relative to the trough such that the trough and a water bottle carried by the clip assembly are in the folded or storage position. When the tabs 413 and 415 are snapped into areas 419a and 419b, the trough and water bottle are positioned and secured in the serving position as illustrated in FIG. 11. The interior surfaces of areas 417a and b and 419a and b are preferably configured so as to mate with the surfaces of the tabs 413 and 415 and the locking bars 413a and 415a provided thereon. Alternatively, the surfaces of the tabs and the walls defining the tabs receiving areas 417a and b and 419a and b could define mating corrugations to enhance the securement of the clip assembly to the locking tabs. Other mating surface configurations also could be employed. If desired, finger grip indentations 410' can be provided in the sides of the trough 410 proximate the rearward end thereof to facilitate attachment of the clip assembly to the trough. The attachment arm 428 of clip assembly 412 is identical to the attachment arm 28 of the first embodiment.

As in the prior embodiment, a resilient belt clip 432 is preferably integrally formed with the extension arm portion 420 of the clip assembly to provide a convenient and inexpensive means for securing the present invention to the belt or waistband of the user's apparel. This belt clip could be added to any of the other embodiments of the present invention. Such a clip configuration utilizes the resilience in the plastic material of which the clip is formed to effect its securement about the user's apparel. Other clip attachments, however, could also be employed. In addition, a lanyard loop 433 could also be provided on clip assembly 412.

Figure 14:
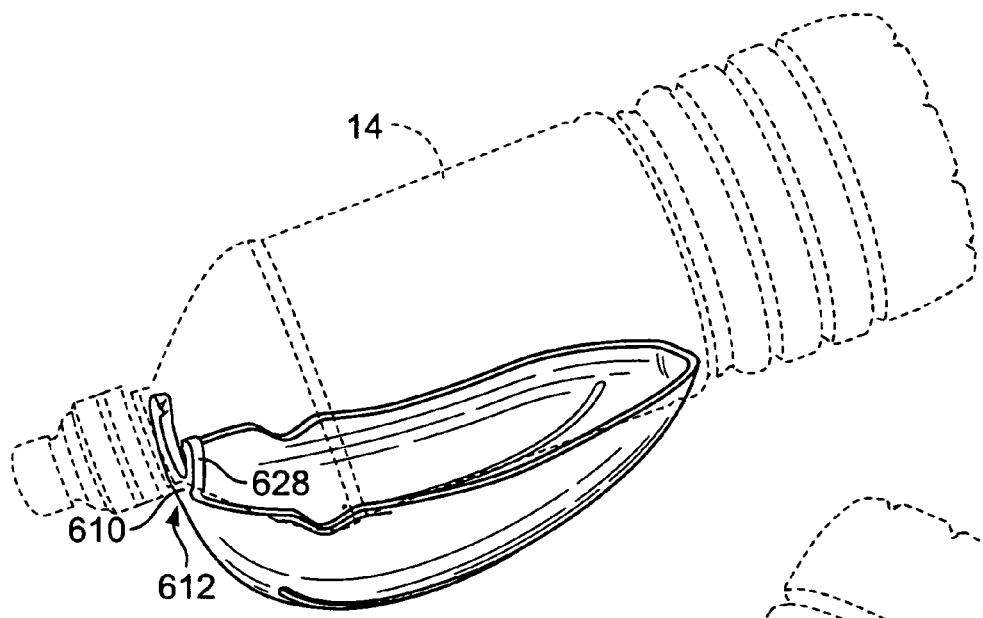
FIG. 14 is a perspective view of a third embodiment of the present invention showing the sports bottle in phantom lines in the nesting position.
Figure 15:
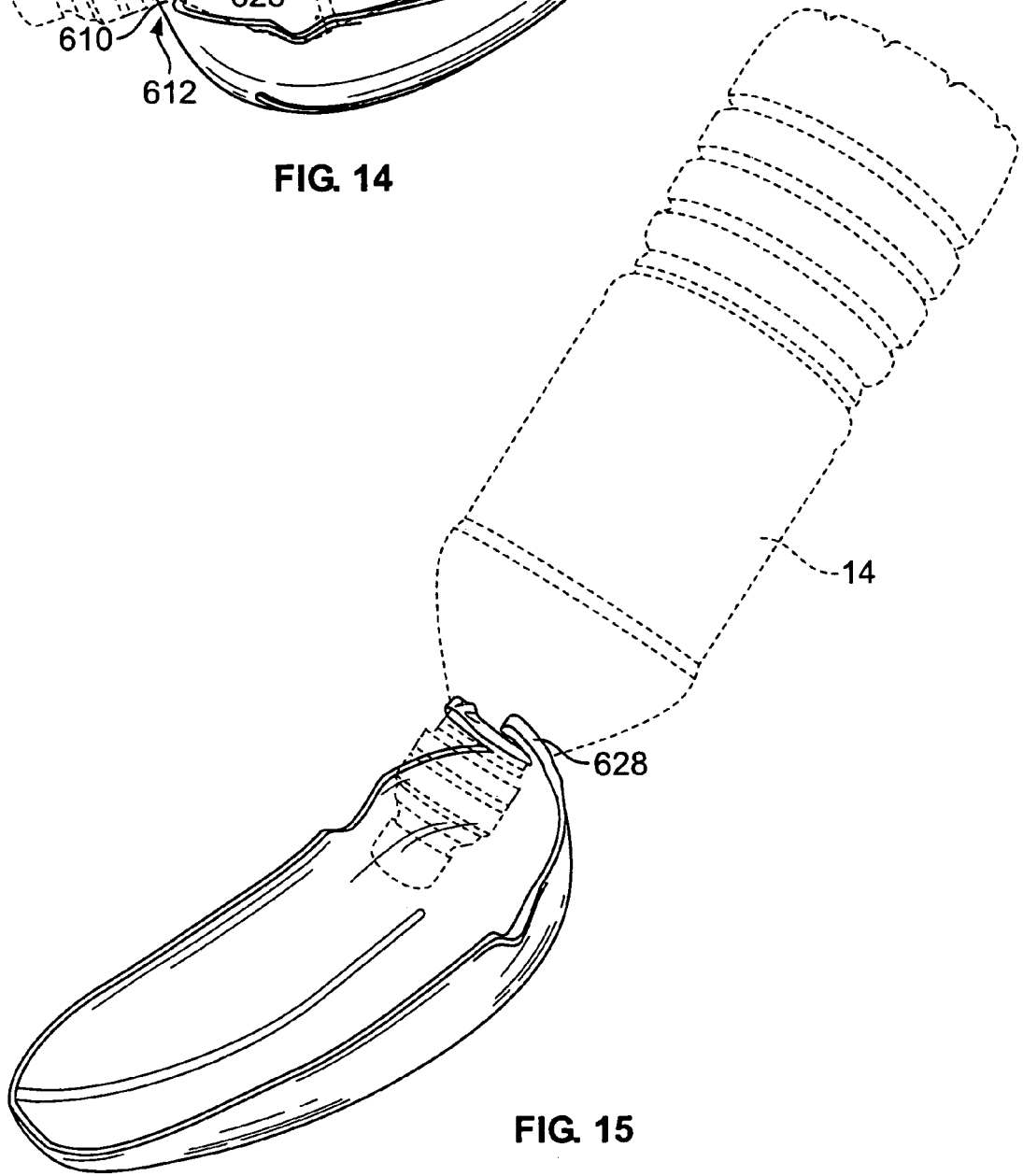
FIG. 15 is a perspective view of a third embodiment of the present invention showing the sports bottle in phantom lines in the serving position.
Figure 16:
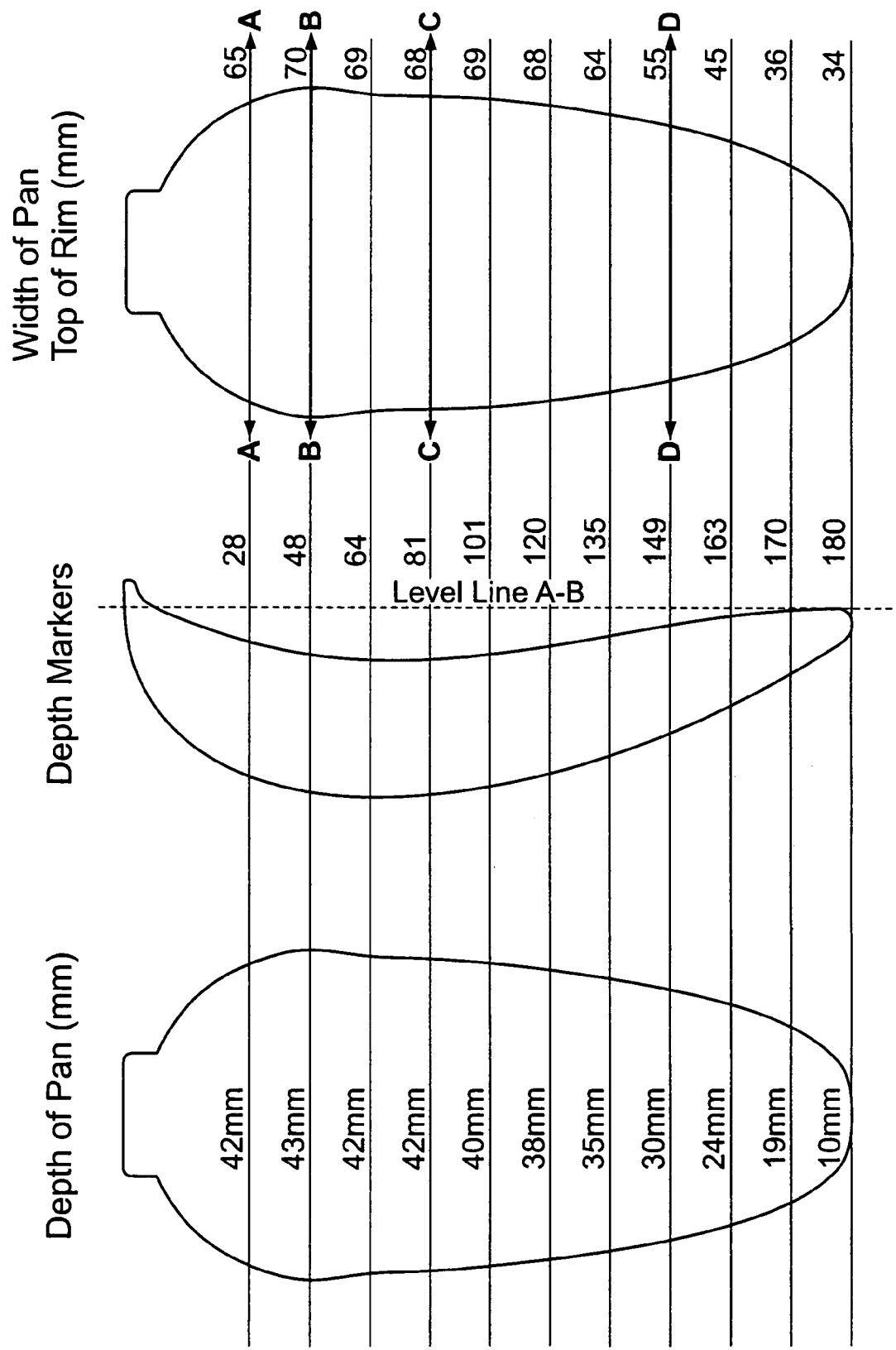
FIGS. 16-20 illustrate the preferred dimensional parameters of the lapping pan or trough employed in the present invention.
Figure 17:
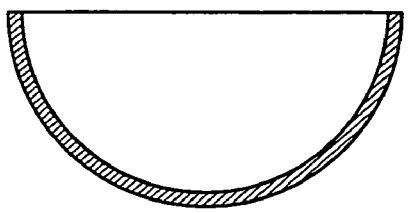
Figure 18:
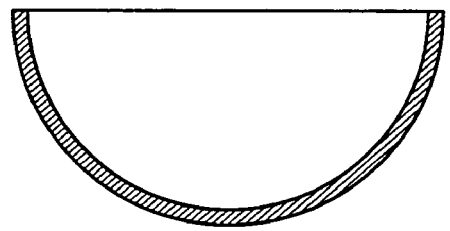
Figure 19:
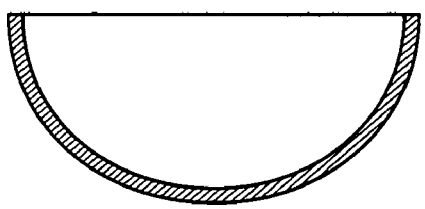
Figure 20:
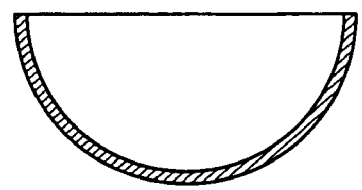

FIGS. 14 and 15 illustrate another embodiment of the present invention wherein the clip 612 is again hingeless but is itself integrally formed with the rearward end of the trough 612 and shaped such that the bifurcated attachment arm portion 628 of the clip 610 snaps about and grips the sports bottle 14 in the neck spacing between the collar and water bottle shoulder in either the storage position or the serving position as illustrated in FIGS. 14 and 15. In such an embodiment, the clip assembly is essentially comprised entirely of the attachment arm portion 628 which projects upwardly, substantially perpendicular to a line extending between the upper edges of the forward and rearward ends of the trough.

In each of the aforesaid embodiments of the invention the lapping pan or trough is designed so as to nest against differently sized sports water bottles. To achieve this result, the trough is particularly configured as shown in the drawings with the preferred dimensions that define the configuration of the pan or trough being shown in FIGS. 16-20. Various changes in these dimensions as well as other changes and modifications can be made in carrying out the present invention without departing from the spirit and scope thereof.

What is claimed is:

1. A portable water drinking device for pets adapted to be used with a conventional sports water bottle of the type having a constant diameter cylindrical neck disposed between a collar portion of the bottle and a shoulder portion, said device comprising a lapping pan defining a forward end portion and a rearward end portion and a clip assembly for carrying the water bottle both in an elevated inclined serving position and in a nesting storage position, said clip assembly comprising an extension arm portion and an attachment arm portion, said extension arm portion projecting from said rearward end portion of said pan and being operatively connected thereto such that said clip assembly is moveable between a first position and a second position, said attachment arm portion projecting from said extension arm portion at a substantially perpendicular disposition with respect thereto and defining a bifurcated bottle gripping end for engaging the neck of a conventional sports water bottle such that when said clip assembly is in said first position, said water bottle is disposed in said serving position for delivering water into said pan and when said assembly is moved to said second position, the water bottle is in said nesting storage position wherein at least a portion of the water bottle is disposed adjacent and within said pan.

2. The portable water drinking device of claim 1 wherein said clip assembly is of single-piece construction.

3. The portable water drinking device of claim 1 wherein said extension arm portion of said clip assembly is pivotally mounted at said rearward end of said pan such that said clip assembly is pivotally movable between said first and second positions.

4. The portable water drinking device of claim 1 including a clip attachment member disposed at said rearward portion of said pan and a pan attachment member disposed at one end of said extension arm portion of said clip assembly, said attachment members being engageable so as to define a removable operative connection of said clip assembly on said pan whereby said clip assembly is selectively mountable on said pan in either said first position or said second position.

5. The portable water drinking device of claim 1 including a resilient spring member integrally formed with and operatively connected to said attachment arm portion of said clip assembly for securing said drinking device to one's apparel.

6. The portable water drinking device of claim 1 wherein said bifurcated bottle gripping end of said attachment arm portion of said clip assembly defines a curvilinear gripping surface generally semi-circular in configuration and sized to abut and mate with the cylindrical neck of a conventional sports water bottle so as to removably secure the bottle to the clip assembly.

7. The portable water drinking device of claim 3 wherein said clip assembly is of single-piece construction.

8. The portable water drinking device of claim 3 including a resilient spring member integrally formed with and operatively connected to said attachment arm portion of said clip assembly for securing said drinking device to one's apparel.

9. The portable water drinking device of claim 3 wherein said bifurcated bottle gripping end of said attachment arm portion of said clip assembly defines a curvilinear gripping surface generally semi-circular in configuration and sized to abut and mate with the cylindrical neck of a conventional sports water bottle so as to removably secure the bottle to the clip assembly.

10. The portable water drinking device of claim 4 wherein said clip assembly is of single-piece construction.

11. The portable water drinking device of claim 4 including a resilient spring member integrally formed with and operatively connected to said attachment arm portion of said clip assembly for securing said drinking device to one's apparel.

12. The portable water drinking device of claim 4 wherein said bifurcated bottle gripping end of said attachment arm portion of said clip assembly defines a curvilinear gripping surface generally semi-circular in configuration and sized to abut and mate with the cylindrical neck of a conventional sports water bottle so as to removably secure the bottle to the clip assembly.

13. The portable water drinking device of claim 6 wherein said gripping surface defines a transverse dimension of about 28 mm.

14. The portable water drinking device of claim 6 wherein said gripping surface defines a transverse dimension of about 28 mm and an axial dimension of about 7 mm.

15. The portable water drinking device of claim 9 wherein said gripping surface defines a transverse dimension of about 28 mm.

16. The portable water drinking device of claim 9 wherein said gripping surface defines a transverse dimension of about 28 mm and an axial dimension of about 7 mm.

17. The portable water drinking device of claim 12 wherein said gripping surface defines a transverse dimension of about 28 mm.

18. The portable water drinking device of claim 12 wherein said gripping surface defines a transverse dimension of about 28 mm and an axial dimension of about 7 mm.

* * * * *